United States Patent
Gleason et al.

(10) Patent No.: US 6,250,684 B1
(45) Date of Patent: *Jun. 26, 2001

(54) D-RING/ROLLER ASSEMBLY FOR SUPPORTING SEAT BELT WEBBING IN A VEHICLE

(75) Inventors: Michael P. Gleason, Chesterfield; Barry J. Maloney, Clinton Township, both of MI (US)

(73) Assignee: TRW Vehicle Safety Systems Inc., Lyndhurst, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/164,492

(22) Filed: Oct. 1, 1998

(51) Int. Cl.⁷ .................................................. B60R 22/36
(52) U.S. Cl. ...................... 280/808; 280/801.1; 280/806; 24/197
(58) Field of Search ................................ 280/808, 801.1, 280/806; 297/483, 476, 479; 24/197, 163 R

(56) References Cited

U.S. PATENT DOCUMENTS

| | | |
|---|---|---|
| 4,351,545 | 9/1982 | Cardew . |
| 4,359,237 | 11/1982 | Gavagan et al. . |
| 4,372,012 * | 2/1983 | Fohl ..................................... 297/483 |
| 4,494,774 * | 1/1985 | Fohl ..................................... 280/806 |
| 4,518,173 * | 5/1985 | Yamada et al. ....................... 280/806 |
| 4,642,853 | 2/1987 | Plesniarski et al. . |
| 4,717,088 * | 1/1988 | Fohl ..................................... 280/806 |
| 4,789,186 | 12/1988 | Andersson . |
| 4,861,070 | 8/1989 | Boag . |
| 4,993,746 | 2/1991 | Hagelthorn . |
| 5,037,135 | 8/1991 | Kotikovsky et al. . |
| 5,415,433 | 5/1995 | Pfeiffer . |
| 5,673,936 | 10/1997 | Möndel . |

* cited by examiner

Primary Examiner—Michael Mar
Assistant Examiner—Hau Phan
(74) Attorney, Agent, or Firm—Tarolli, Sundheim, Covell, Tummino & Szabo L.L.P.

(57) ABSTRACT

An apparatus (22) includes a webbing roller (32), a brake structure (80), and a support structure (62, 62). The roller (32) includes a spool (50) and a pair of axially opposite spindle structures (52) centered on an axis of rotation (53). A rotatable outer surface (54) of the spool (50) is configured to engage seat belt webbing (16). The support structure (62, 62) is configured to support the roller (32) in an ordinary operating position in which the outer surface (54) of the spool (50) is spaced radially from a braking surface (82) on the brake structure (80). The support structure (62, 62) is further configured to support the roller (32) for movement under the influence of tension in the seat belt webbing (16). Such movement of the roller (32) includes uniform movement radially from the ordinary operating position to a restrained position in which the outer surface (54) of the spool (50) engages the braking surface (82) on the brake structure (80).

7 Claims, 3 Drawing Sheets

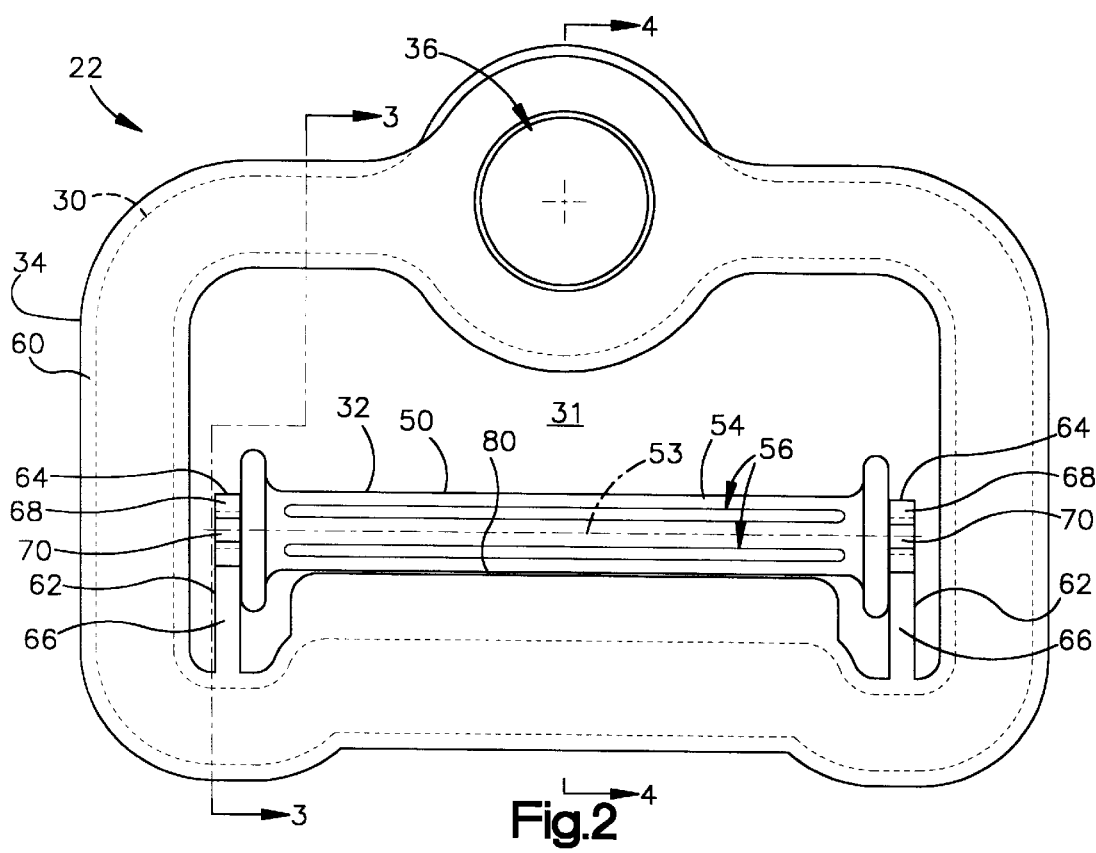
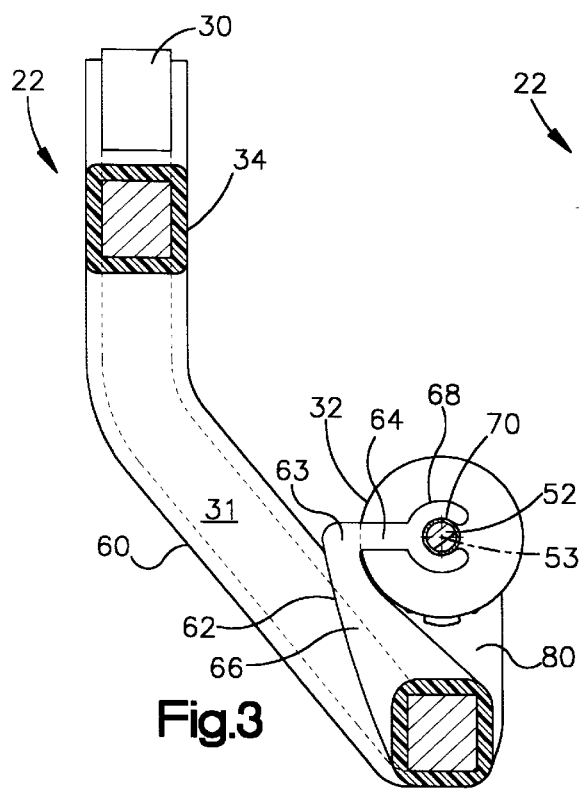
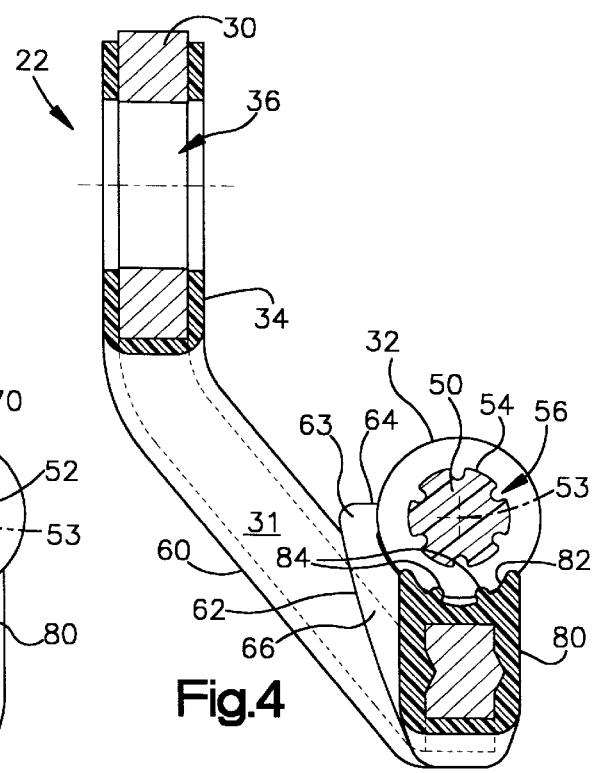

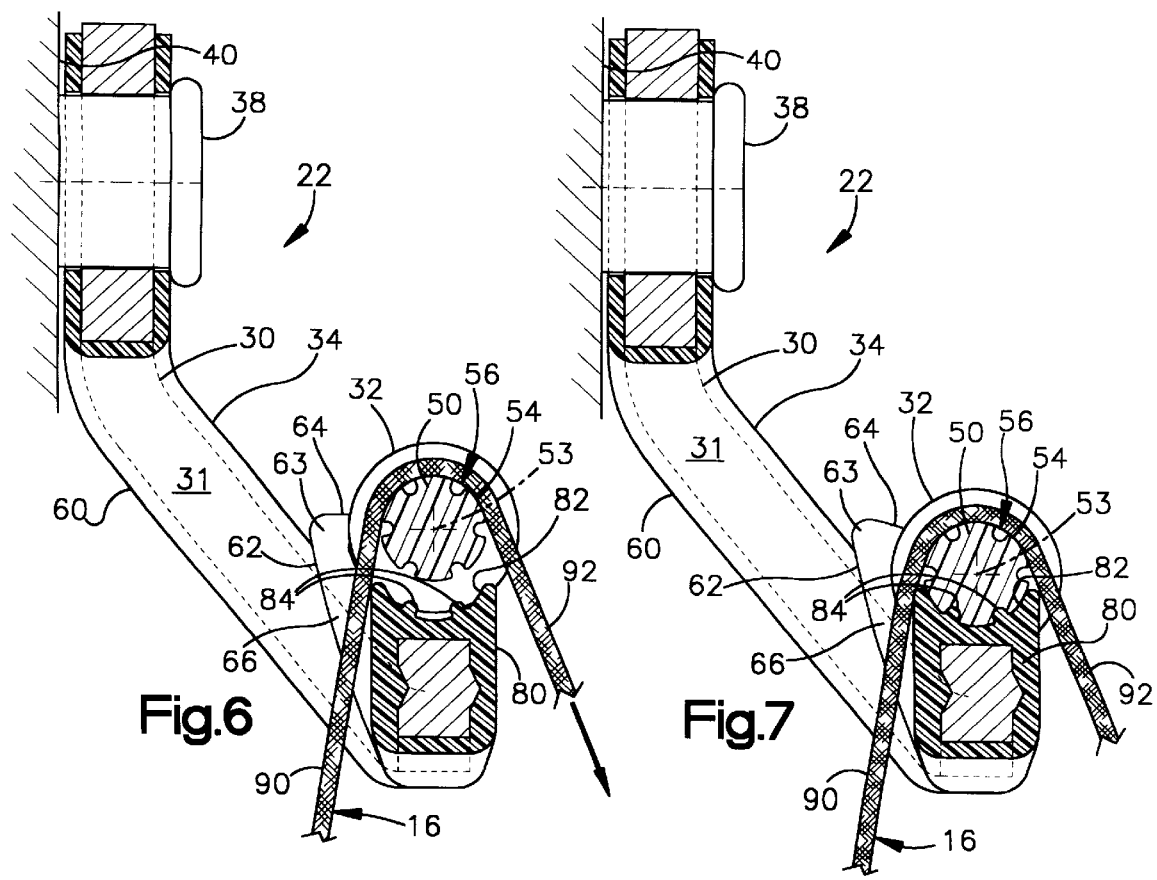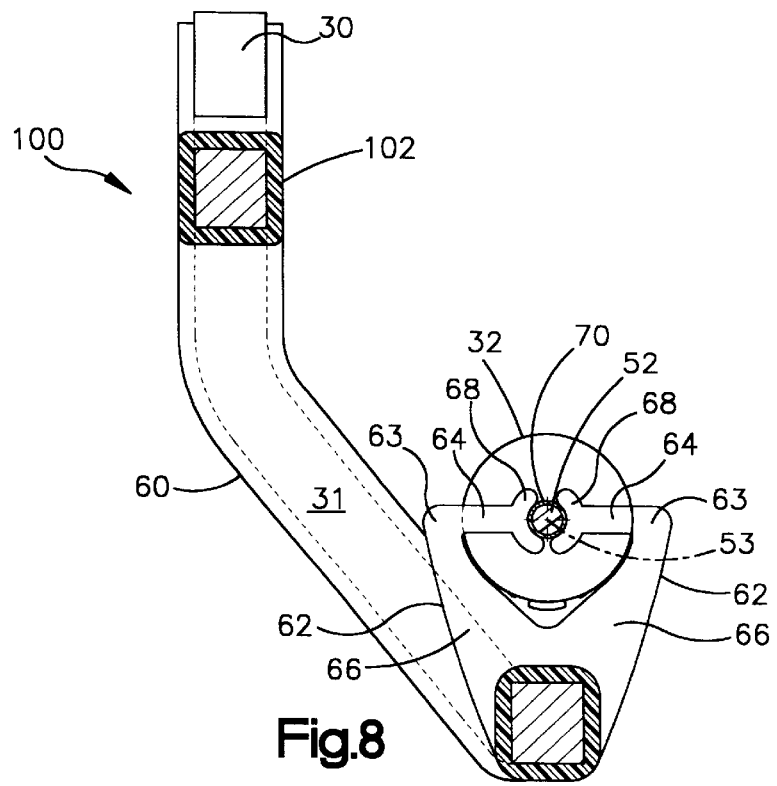

D-RING/ROLLER ASSEMBLY FOR SUPPORTING SEAT BELT WEBBING IN A VEHICLE

FIELD OF THE INVENTION

The present invention relates to an apparatus for supporting seat belt webbing in a vehicle, and particularly relates to an apparatus including both a D-ring and a roller for the webbing.

BACKGROUND OF THE INVENTION

A vehicle seat belt system may include a D-ring for supporting the seat belt webbing at a location beside the shoulder of a seated vehicle occupant. The webbing in such a system typically extends upward from a seat belt retractor to the D-ring, through the D-ring, and downward from the D-ring to an anchor beside the seat. The webbing moves longitudinally through the D-ring when the occupant extracts the webbing from the retractor, and also when the webbing is being retracted by the retractor. In some cases, the D-ring is equipped with a webbing roller for facilitating longitudinal movement of the webbing through the D-ring.

SUMMARY OF THE INVENTION

In accordance with the presence invention, an apparatus comprises a webbing roller, a brake structure, and a support structure. The roller includes a spool and a pair of axially opposite spindle structures centered on an axis of rotation. A rotatable outer surface of the spool is configured to engage seat belt webbing. The support structure is configured to support the roller in an ordinary operating position in which the outer surface of the spool is spaced radially from a braking surface on the brake structure. The support structure is further configured to support the roller for movement under the influence of tension in the seat belt webbing. Such movement of the roller includes uniform movement radially from the ordinary operating position to a restrained position in which the outer surface of the spool engages the braking surface on the brake structure.

BRIEF DESCRIPTION OF THE DRAWINGS

The foregoing and other features of the present invention will becomes apparent to one skilled in the art to which the present invention relates upon reading the following description of the invention with reference to the accompanying drawings, wherein:

FIG. 2 is an enlarged view of parts of the apparatus of FIG. 1;

FIG. 3 is a view taken on line 3—3 of FIG. 2;

FIG. 4 is a view taken on line 4—4 of FIG. 2;

FIG. 6 is a view similar to FIG. 4 showing other parts of the apparatus of FIG. 1;

FIG. 7 is a view similar to FIG. 6 showing parts in different positions; and

FIG. 8 is a view similar to FIG. 3 showing parts of an apparatus comprising a second embodiment of the present invention.

DESCRIPTION OF PREFERRED EMBODIMENTS

Figure 1:
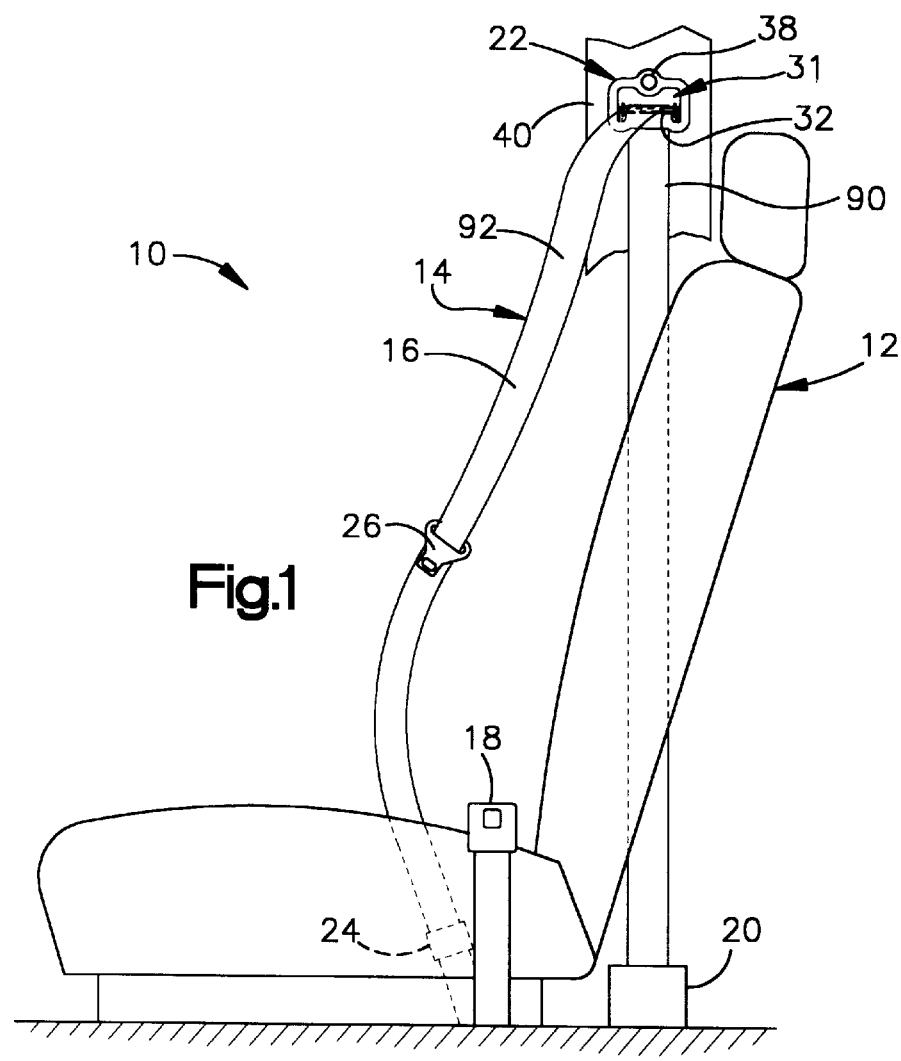
FIG. 1 is a side view of an apparatus comprising a first embodiment of the present invention.

An apparatus 10 comprising a first embodiment of the present invention is shown in FIG. 1. The apparatus 10 includes a vehicle seat 12 and a seat belt system 14 for restraining an occupant of the seat 12. The seat belt system 14 includes seat belt webbing 16 and a seat belt buckle 18. The webbing 16 extends upward from a seat belt retractor 20 to a D-ring/roller assembly 22, through the D-ring/roller assembly 22, and downward from the D-ring/roller assembly 22 to an anchor 24. A tongue 26 on the webbing 16 is releasably lockable in the buckle 18 when the webbing 16 has been extracted from the retractor 20 and extended around an occupant of the seat 12.

As shown separately in FIGS. 2–4, the D-ring/roller assembly 22 includes a D-ring 30 defining a somewhat rectangular passage 31 for receiving the webbing 16. The D-ring 30 is a rigid metal part that functions as a structural frame for the other parts of the assembly 22. Such other parts include a webbing roller 32 and a plastic cover 34. The cover 34 extends over nearly the entire D-ring 30 and supports the roller 32 on the D-ring 30. An aperture 36 in the D-ring 30 receives a fastener 38 (FIG. 1) which mounts the assembly 22 on a vehicle pillar 40 beside the seat 12.

Figure 5:
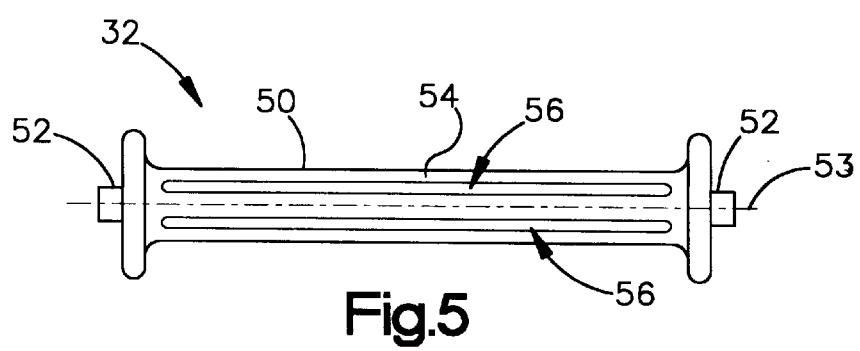
FIG. 5 is a view of a part shown in FIG. 2.

The roller 32 (FIG. 5) comprises a spool 50 and a pair of axially opposite spindle structures 52 centered on a longitudinal axis 53. A cylindrical outer surface 54 of the spool 50 is interrupted by a plurality of axially extending grooves 56. In the first embodiment of the present invention, the spool 50 and the spindle structures 52 are rotationally fixed relative to each other. This is preferably accomplished by forming the roller 32 as a one-piece plastic part made from a single homogenous material. By "one-piece" it is meant that the roller 32 is a single unit exclusive of separate but joined elements. Additionally, the homogenous material preferably is a rigid plastic, such as nylon, so that the roller 32 is substantially non-deflectable under the influence of tension in the webbing 16.

The cover 34 in the first embodiment of the invention also is a one-piece plastic part. As best shown in FIG. 2, the cover 34 has a major body portion 60 extending over the D-ring 30 fully around the passage 31. The cover 34 further has a pair of support arms 62 projecting from the major body portion 60 at adjacent lower corners of the passage 31. Each support arm 62 has an angular configuration with an elbow 63 (FIG. 3) and upper and lower sections 64 and 66 intersecting at the elbow 63. Each upper section 64 has a C-shaped free end portion 68. The free end portions 68 of the upper sections 64 receive and support metal bushings 70 which, in turn, receive and support the spindle structures 52 at the opposite ends of the roller 32. The roller 32 is thus supported in an ordinary operating position in which it is freely rotatable about the axis 53 relative to the bushings 70, the cover 34, and the D-ring 30.

The cover 34 includes a brake structure 80 which is located beneath the spool 50. The brake structure 80 has a braking surface 82 (FIG. 4). The braking surface 82 has a concave cylindrical contour spaced radially from the cylindrical outer surface 54 of the spool 50, and extends along nearly the entire length of the cylindrical outer surface 54. A plurality of axially extending ribs 84 on the brake structure 80 project radially from the braking surface 82 toward the spool 50.

When the D-ring/roller assembly 22 is mounted on the pillar 40, as shown in FIG. 1, the webbing 16 extends longitudinally through the passage 31 and over the roller 32. The webbing 16 then has a first section 90 extending vertically between the roller 32 and the retractor 20, and has a second section 92 extending vertically between the roller 32 and the anchor 24. As shown in greater detail in FIG. 6, the webbing 16 extends partially around the cylindrical outer surface 54 of the spool 50. The webbing 16 is thus engaged with the roller 32 so as to rotate the roller 32 about the axis 53 when the webbing 16 is being moved longitudinally by an occupant of the seat 12 or by the retractor 20.

A seated vehicle occupant around whom the webbing 16 extends may move suddenly and forcefully against the webbing 16 under the influence of vehicle crash forces. The occupant will then impart tension to the webbing 16. The tension in the webbing 16 may urge the second section 92 of the webbing 16 to move longitudinally downward from the roller 32, as indicated by the arrow shown in FIG. 6, and thereby to rotate the roller 32 in a clockwise direction as viewed in FIG. 6. The crash forces acting against the seated vehicle occupant may meet or exceed a threshold level for which use of the brake structure 80 is desired to help restrain such movement of the webbing 16. If so, the resulting tension in the webbing 16 will be great enough to pull the roller 32 downward from the position of FIG. 6 to the position of FIG. 7. More specifically, the roller 32 will transmit vertical loads from the webbing 16 to the bushings 72 and the support arms 62 at the opposite ends of the roller 32. The vertical loads will cause the upper and lower sections 64 and 66 of each support arm 62 to deflect pivotally relative to each other about the respective elbow 63 so as to carry the roller 32 downward from the position of FIG. 6 to the position of FIG. 7. The braking surface 82 on the brake structure 80 will then engage the cylindrical outer surface 54 of the spool 50 to restrain rotation of the roller 32. Each rib 84 is receivable in a groove 56 to enhance the braking effect achieved upon movement of the roller 32 into engagement with the braking structure 80.

As noted above, the roller 32 is substantially non-deflectable under the influence of tension in the webbing 16. Moreover, the support arms 62 are configured to deflect simultaneously and equally so that the entire roller 32, including the spool 50 and the spindle structures 52, experiences uniform movement radially from the ordinary operating position of FIG. 6 to the restrained position of FIG. 7. This helps to ensure that the cylindrical outer surface 54 of the spool 50 moves into engagement with the braking surface 82 uniformly along its length.

A D-ring/roller assembly 100 comprising a second embodiment of the present invention is shown in FIG. 8. The D-ring/roller assembly 100 of FIG. 8 has many parts that are substantially the same as corresponding parts of the D-ring/roller assembly 22 described above. This is indicated by the use of the same reference numbers for such corresponding parts in FIGS. 8 and 3. The D-ring/roller assembly 100 thus includes a D-ring 30, a roller 32, and a pair of bushings 70 (one of which is shown in FIG. 8) like those described above. However, the D-ring/roller assembly 100 further includes a one-piece plastic cover 102 which differs from the cover 34 described above.

Unlike the cover 34, which has a single support arm 62 at each end of the roller 32, the cover 102 has a pair of oppositely oriented support arms 62 at each end of the roller 32. Each support arm 62 in the D-ring roller/assembly 100 is deflectable under the influence of tension in seat belt webbing in substantially the same manner as described above with reference to deflection of the support arms 62 in the D-ring roller/assembly 22. The roller 32 in the second embodiment is thus supported for uniform movement radially from an ordinary operating position to a restrained position in accordance with the present invention.

From the above description of the invention, those skilled in the art will perceive improvements, changes and modifications. Such improvements, changes and modifications within the skill of the art are intended to be covered by the appended claims.

Having described the invention, the following is claimed:

1. A D-ring assembly for supporting seat belt webbing in a vehicle comprising:

a rotatable webbing roller including a spool and a pair of axially opposite spindle structures, said spool having a cylindrical outer surface and axially opposite ends, a first spindle structure being fixedly connected to and extending axially away from a first end of said spool, a second spindle structure being fixedly connected to and extending axially away from a second end of said spool, said spindle structures and said cylindrical outer surface being centered on an axis of rotation, said outer surface of said spool being configured to engage the seat belt webbing and having an equal diameter along an axial length of said spool, said axial length of said spool being measured along said axis;

a brake structure having a braking surface; and a support structure supporting said roller by supporting said spindle structures;

said support structure being configured to support said roller in a first operating position in which said outer surface of said spool is spaced radially away from and at an equal distance away from said braking surface along said axial length of said outer surface, said roller being rotatable relative to said support structure when said roller is in said first operating position;

said support structure being deflectable under the influence of tension in the seat belt webbing to enable movement of said roller from said first operating position to a restrained position in which said outer surface of said spool engages said braking surface with equal force along said axial length of said outer surface of said spool, said roller being non-rotatable relative to said support structure when said roller is in said restrained position;

said roller, including said spindle structures and said spool, moving an equal radial distance from said first operating position to said restrained position.

2. The D-ring assembly as defined in claim 1 wherein said roller is substantially non-deflectable under the influence of tension in the seat belt webbing.

3. The D-ring assembly as defined in claim 1 wherein said spool and said spindle structures are rotationally fixed relative to each other.

4. The D-ring assembly as defined in claim 3 wherein said roller is a one-piece plastic part including said spool and said spindle structures.

5. The D-ring assembly as defined in claim 1 wherein said support structure is deflectable under vehicle crash forces so as to carry said roller from said ordinary operating position to said restrained position upon deflecting under vehicle crash forces transmitted through said roller from the seat belt webbing to said support structure.

6. The D-ring assembly as defined in claim 1 wherein said support structure includes pivotally deflectable support arms, said spindle structures being mounted on said support arms for said roller to experience said uniform movement upon deflection of said support arms under the influence of tension in the seat belt webbing.

7. Apparatus as defined in claim 1 wherein said brake structure and said support structure are portions of a one-piece plastic part.

* * * * *